(12) United States Patent
Gupta et al.

(10) Patent No.: US 7,638,468 B2
(45) Date of Patent: Dec. 29, 2009

(54) SURFACTANT BASED VISCOELASTIC FLUIDS

(75) Inventors: D. V. Satyanarayana Gupta, Calgary (CA); Greg Niechwiadowicz, Calgary (CA); Kewei Zhang, Calgary (CA)

(73) Assignee: BJ Services Company, Houston, TX (US)

( * ) Notice: Subject to any disclaimer, the term of this patent is extended or adjusted under 35 U.S.C. 154(b) by 198 days.

(21) Appl. No.: 10/345,104

(22) Filed: Jan. 15, 2003

(65) Prior Publication Data

US 2004/0138071 A1 Jul. 15, 2004

(51) Int. Cl.
*C09K 8/72* (2006.01)

(52) U.S. Cl. ............... 507/240; 507/248; 507/250; 507/269; 507/266; 507/276; 507/255

(58) Field of Classification Search ........... 507/240, 507/922, 923, 266, 276; 166/307, 308.2, 166/308.3
See application file for complete search history.

(56) References Cited

U.S. PATENT DOCUMENTS

| | | | | |
|---|---|---|---|---|
| 4,534,875 | A * | 8/1985 | Rose | 252/71 |
| 4,615,825 | A * | 10/1986 | Teot et al. | 516/67 |
| 4,695,389 | A | 9/1987 | Kubala | |
| 4,770,814 | A * | 9/1988 | Rose et al. | 516/67 |
| 4,790,958 | A * | 12/1988 | Teot | 507/237 |
| 4,806,256 | A * | 2/1989 | Rose et al. | 252/71 |
| 4,880,565 | A * | 11/1989 | Rose et al. | 516/61 |
| H751 | H * | 3/1990 | Sullivan et al. | 507/240 |
| 5,258,137 | A * | 11/1993 | Bonekamp et al. | 516/11 |
| 5,622,919 | A * | 4/1997 | Brezinski et al. | 507/90 |
| 5,697,443 | A * | 12/1997 | Brezinski et al. | 166/307 |
| 5,979,555 | A * | 11/1999 | Gadberry et al. | 166/270.1 |
| 5,979,557 | A * | 11/1999 | Card et al. | 166/300 |
| 6,194,356 | B1 * | 2/2001 | Jones et al. | 507/225 |
| 6,232,274 | B1 | 5/2001 | Hughes et al. | |
| 6,306,800 | B1 * | 10/2001 | Samuel et al. | 507/129 |
| 6,399,546 | B1 | 6/2002 | Chang et al. | |
| 6,410,489 | B1 | 6/2002 | Zhang et al. | |
| 6,468,945 | B1 | 10/2002 | Zhang | |
| 6,605,570 | B2 * | 8/2003 | Miller et al. | 507/211 |
| 2002/0039972 | A1 | 4/2002 | Allan et al. | |
| 2002/0132741 | A1 | 9/2002 | Chang | |
| 2003/0008781 | A1 | 1/2003 | Gupta | |
| 2004/0152604 | A1 * | 8/2004 | Qu et al. | 507/200 |

FOREIGN PATENT DOCUMENTS

| WO | WO 01/83946 | 11/2001 |
|---|---|---|
| WO | WO 02/18745 | 3/2002 |

* cited by examiner

*Primary Examiner*—Marc S Zimmer
(74) *Attorney, Agent, or Firm*—John Wilson Jones; Jones & Smith, LLP

(57) ABSTRACT

The invention relates to surfactant based viscoelastic fluids for enhancing the productivity of a hydrocarbon-bearing formations, such as oil wells. The viscoelastic fluids of the invention have particular applicability in acid fracturing of subterranean formations surrounding oil and gas wells. The viscoelastic fluid contains an inorganic acid and at least one $C_{10}$ to $C_{24}$ alkyl trialkyl quaternary ammonium aromatic salt such as quaternary ammonium salicylate or phthalate. An anionic surfactant may also be present in the viscoelastic fluid. The addition of the $C_{10}$ to $C_{24}$ alkyl trialkyl quaternary ammonium aromatic salt to the inorganic acid causes gellation of the acid.

22 Claims, 2 Drawing Sheets

SURFACTANT BASED VISCOELASTIC FLUIDS

FIELD OF THE INVENTION

The present invention relates to viscoelastic fluids for enhancing the productivity of a hydrocarbon-bearing formation. In a preferred embodiment, the invention relates to viscoelastic fluids for acid fracturing subterranean formations, such as the formation surrounding oil or gas wells, to increase their viscosity at high temperatures. In addition to their use in acid fracturing, the viscoelastic fluids are useful in matrix acidizing.

BACKGROUND OF THE INVENTION

Subterranean formations of oil and gas wells are often treated by hydraulically fracturing the formations to increase the production of oil or gas. Fracturing of the formations is accomplished by pumping fluids into the bore holes of the oil or gas wells under high pressure so that cracks or fissures are opened into the surrounding formation. Typically, the fracturing fluid is a polymer which has been gelled to increase its viscosity. The fracturing fluid's viscosity is proportionally related to the created fracture geometry and fracture width so that more viscous fluids will produce longer and wider fractures. After the fracturing fluid is injected into the formation to produce the fracture, the viscosity of the fluid is reduced by means of "gel breakers" which break down the gelled fluid so that it can be easily pumped and removed from the well.

In certain formations, aqueous acid solutions can be used to improve the permeability of the formation, thereby increasing production. These acids are often combined with the polymer gels used in fracturing to provide an acid fracturing fluid. One of the benefits of combining the aqueous acid solutions with gelled fracturing fluids is that the gelled fluid inhibits or retards the reaction of the acid with the formation. This is beneficial in that the acid would otherwise react too quickly, depleting the acid with very little penetration of the formation. Once in place, the viscosity of the fluid is reduced so that the acid is released to react with formation damage or other skin present at the face of the newly formed fractures and improving the permeability of the producing strata.

Crosslinked synthetic polymer gels have been particularly useful with such aqueous acid solutions. Crosslinked gels are able to withstand the high temperature conditions commonly found in deeper oil and gas wells with little reduction in viscosity, and they exhibit an improved ability in reducing the reaction rate of the acid solution. Organometallic compounds are often used as a crosslinking agent in these polymer gels. It has been found that gels crosslinked with zirconium and titanium compounds can be treated with certain gel breaking substances, such as fluoride, phosphate or sulfate anions, to break the linkages of the crosslinked polymer fluid, thus reducing the viscosity of the gel. However, these polymers, even after the reduction in viscosity, produce residue in sufficient amounts to damage the formation.

Typically, crosslinked polymer gels are prepared by batch mixing. In the batch mix process, acid is contained in a storage tank which connects to a blender via a suction pump. The suction pump draws the acid into the blender and through the blender tub, where a polymer (with an inverting agent or internal activator blended in) is added via a chemical additive unit attached to the blender tub. Agitation and shear are applied, and the acid/polymer mixture is circulated back through the storage tank containing the acid. The process is repeated over and over again until an acid gel having the desired viscosity is attained. The acid gel must be stored in the tank to allow the polymer to hydrate before the crosslinker is added. If the crosslinking agent is added too early, it will prevent the hydration of the polymer. Once the polymer is properly hydrated, the crosslinking agent is blended into the acid gel, and the crosslinked polymer gel is injected into the wellbore.

The batch mixing process has several disadvantages, including the delay associated with waiting for the acid gel to re-circulate and waiting for the polymer to hydrate. Typical hydration times with polymers known in the art are 30 minutes to several hours. It is not uncommon for the final polymer gel composition to be of less than desirable consistency, and if polymer concentrates are not hydrated fully, "fish eyes" of unhydrated polymers form. These fish eyes can significantly impair permeability into the wellbore. Batch mixing is also inefficient and costly because if any mechanical problems force the job to shut-down early, the components of the unused batch-mixed gel product must be discarded.

There are also disadvantages associated with polymers known in the art, which are typically available as polymer dispersions with a preblended inverting agent (i.e., an internal activator). Because an inverting agent increases a polymer dispersion's viscosity, a polymer dispersion having an inverting agent blended therein will become more and more viscous over time. As a result, the polymer dispersion's pourability and stability are affected, reducing the polymer dispersion's shelf-life and eventually making the polymer dispersion useless. Further, the end-user cannot control the polymer dispersion's viscosity profile by choosing how much inverting agent to use for a particular application. Finally, the use of nonylphenolethoxylate, an inverting agent commonly preblended in polymer dispersions known in the art, has been banned in the North Sea due to environmental concerns.

In addition to the need for improved materials for acid fracturing subterranean formations surrounding oil and gas wells, a need exists for systems useful in matrix acidizing. Matrix acidizing refers to the process of injecting formation stimulation fluid, such as acids, that react with minerals in the formation to increase the formation permeability. Matrix acidizing treatments of the prior art are hampered by radial penetration and axial distribution. Radial penetration is caused by the quick reaction of the acid with the wellbore coating upon introduction into the formation. Viscoelastic fluids of the prior art further often failed to penetrate areas distal to the wellbore. Axial distribution refers to the ability to deliver the viscoelastic fluid to the desired zone within the wellbore. Injection of the viscoelastic fluid within the wellbore causes dissolution of the calcium carbonate which, in turn, causes a formation of a channel through the matrix. As additional fluid is pumped into the formation, it tends to flow along the channel, leaving the rest of the formation untreated. With the acidizing fluids of the prior art, typically, an additional means of diversion, either mechanical or chemical, is used to get better distribution of the acid. Chemical diverters can include foams or viscous gels, injected as stages in between the acid stages. A need therefore exists for the development of matrix acidizing fluids which evenly penetrate into the formation and which react less quickly with the wellbore coating as it is introduced into the formation.

SUMMARY OF THE INVENTION

The invention relates to surfactant based acid viscoelastic materials for enhancing the production of a hydrocarbon bearing formation. In a preferred embodiment, the viscoelastic material is used in acid fracturing subterranean formations surrounding oil and gas wells. In addition, the invention relates to the use of surfactant based acid gels in matrix acidizing techniques.

In the invention, an acid, such as hydrochloric acid, is gelled using a quaternary ammonium salicylate or phthalate. An anionic surfactant may also be used. The gels form instantaneously and need not be batch mixed. Since the gels form instantly, it is the gelled fluid which is pumped into the formation. At less than 70° C., no corrosion inhibitor is needed with the system to prevent corrosion of oil field tubulars. At higher temperatures, conventional corrosion inhibitors used in the industry may be used.

Additionally, conventional breakers used in surfactant gels can be added to reduce the viscosity with time and temperature. The gelled acid can also be either energized or foamed with nitrogen or carbon dioxide. Without any additional additives, the system is compatible with sludge forming crudes and forms no emulsions with crude oil.

DETAILED DESCRIPTION OF PREFERRED EMBODIMENTS

Figure 1:
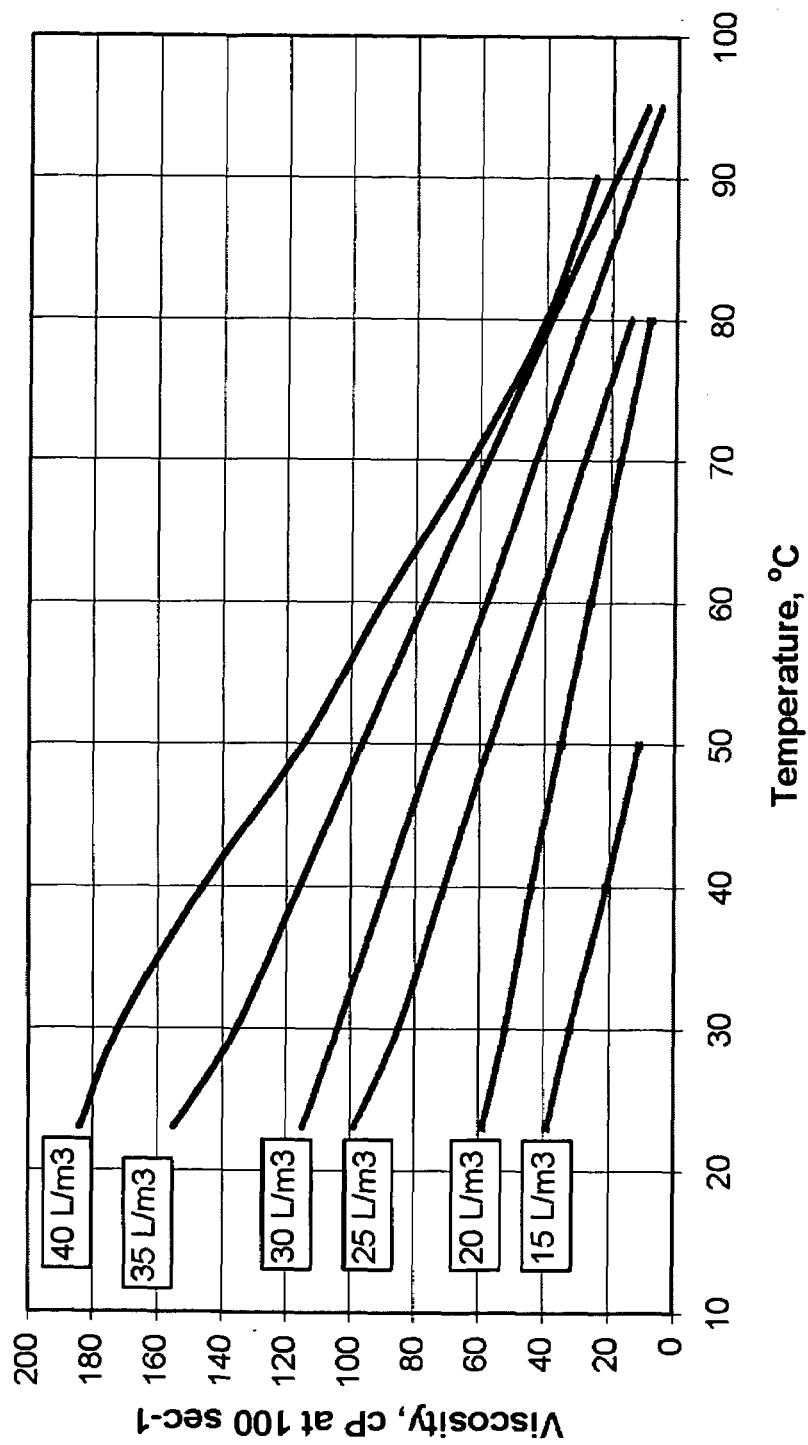
FIG. 1 is a graph of viscosity at combined surfactant concentrations against temperature.

The present invention provides a viscoelastic fluid capable of achieving high viscosity at a wide range of temperatures. The fluid is a surfactant based gelled acid system. The fluid contains a $C_{10}$ to $C_{24}$ alkyl trialkyl quaternary ammonium aromatic salt. The alkyl group forming the alkylated moiety can be a $C_{10}$ to $C_{24}$ alkyl group, preferably a $C_{12}$ to a $C_{20}$ alkyl. In a most preferred embodiment, the alkyl group forming the alkylated moiety is a $C_{18}$ alkyl. The aromatic salt is preferably an aromatic salicylate or phthalate. The trialkyl moiety contains preferably from $C_1$ to $C_4$ alkyl groups, most preferably methyl. In a preferred mode, the surfactant is a gelled $C_{18}$ trimethyl quaternary ammonium phthalate or a gelled $C_{18}$ trimethyl quaternary ammonium salicylate. Typically, the weight percent of the $C_{10}$ to $C_{24}$ alkyl trialkyl quaternary ammonium aromatic salts in the viscoelastic fluid is between from about 3 to about 100 weight percent, preferably between from about 5 to about 20 weight percent.

Such $C_{10}$ to $C_{24}$ alkyl trialkyl quaternary ammonium aromatic salts may be formed by mixing a $C_{10}$ to $C_{24}$, preferably a $C_{18}$, alkyl trialkyl quaternary ammonium chloride with an alkali aromatic salt, such as a sodium salt of either salicylic acid or phthalic acid. The gels form instantaneously and need not be batch mixed.

An inorganic acid, such as hydrochloric acid, hydrofluoric acid or phosphoric acid or a mixture thereof, can be gelled with the alkylated trialkyl quaternary aromatic salt such as salicylate or phthalate. The weight percentage of inorganic acid in the viscoelastic fluid is between from about 10 to about 35, preferably between from about 15 to about 28, weight percent.

The addition of the aromatic salt directly to the acid is operationally simple especially since no hydration is involved. The viscosity of the gelled acid is reduced by the reaction of the acid with the formation. The viscosity is also reduced when mixed with liquid hydrocarbon from the formation. The viscosity can also be reduced by incorporating a slowly releasable hydrocarbon that can be controlled by solubility or by encapsulation.

The viscoelastic fluid may further contain an anionic surfactant. Suitable anionic surfactants include sodium xylene sulfonate. When present, the anionic surfactant is present in the fracturing fluid in an amount from about 1 L/m$^3$ to about 10 L/m$^3$ based on the weight of the viscoelastic fluid.

Without the presence of iron, the gel of the invention does not need additional corrosion inhibitors for corrosion protection at less than 70° C. At higher temperatures, such as between 71° C. to 105° C., a corrosion inhibitor package is often desired with the system to prevent corrosion of oil field tubulars. Any corrosion inhibitor package known in the art may be used. Preferred corrosion inhibitor packages include those containing propargyl alcohol with potassium iodide. Typically, the amount of corrosion inhibitor package in the viscoelastic fluid is between from about 5 to about 25 weight percent.

The system is stable with the presence of dissolved ferric iron, which may occur from the tubulars or the formation, with conventional iron control agents used in industry. The conventional iron control agents, for example, include thioglycolic acid and copper sulfate pentahydrate. In the presence of iron, the gel of the invention desirably contains a corrosion inhibitor.

Additionally, conventional breakers used in surfactant gels can be added to reduce the viscosity with time and temperature.

The gelled acid can also be either energized or foamed with nitrogen or carbon dioxide. The addition of a foam typically increases the viscosity of the fracturing fluid. Typically, the word "energized" refers to a fluid containing less than 63 volume percent of a foaming agent (e.g. nitrogen or carbon dioxide). Typically, the term "foamed" refers to a fluid that contains more than 63 volume percent of a foaming agent. While nitrogen and carbon dioxide are described as examples of foaming agents which may be used it is to be appreciated that in accordance with the instant invention, any foaming agent known in the art may be utilized.

Without any additional additives, the system is compatible with sludge forming crudes and forms no emulsions with the crudes.

The viscoelastic fluid have particular applicability as fracturing fluids for fracturing subterranean formations, including those formations surrounding oil or gas wells. The viscoelastic fluids of the invention find applications in matrix acidizing. Techniques of acid fracturing and matrix acidizing are well known in the art. The viscoelastic fluid, at 20° C., typically exhibits a viscosity of from about 40 to about 230 cP @ 100 sec$^{-1}$.

The following examples will illustrate the practice of the present invention in its preferred embodiments. From the foregoing, it will be observed that numerous variations and modifications may be effected without departing from the true spirit and scope of the novel concepts of the invention.

EXAMPLES

Unless stated to the contrary, the term "percent" herein refers to weight percent.

Series A

Loading Optimization of the Surfactant Gellants. Sodium salicylate and $C_{18}$ trimethyl quaternary ammonium chloride ("FAC-1W") were premixed at room temperature for five minutes. The optimized reaction product is referred to as "FAC-4W" and was demonstrated to be 15 kg of sodium salicylate in 200 L of FAC-1W. The anionic surfactant, sodium xylene sulfonate, is referred to as FAC-2. The effective viscosity was calculated at 100 sec$^{-1}$ and is set forth in Table I below.

TABLE I

Effective Viscosity at 25° C.

| FAC-1W, L/m³ | FAC-2, L/m³ | Sodium Salicylate, kg/m³ | Viscosity at 100 sec$^{-1}$, CP |
|---|---|---|---|
| 10 | 5.0 | 0.67 | <5 |
| 20 | 10 | 1.5 | 126 |
| 40 | 5.0 | 3.0 | 260 |
| 20 | — | 3.0 | <5 |
| 28 | — | 3.0 | 60 |
| 32 | — | 3.0 | 116 |
| 40 | — | 6.0 | <5 |
| 40 | — | 5.0 | 58 |
| 36 | — | 4.0 | <5 |
| 40 | — | 4.0 | 108 |
| 40 | — | 3.0 | 184 |

Effects of Temperature on Gel Viscosity. The optimized gel was gradually heated up to a maximum of 95° C. in a Baroid heating cup. The rheology was measured at various intermediate temperatures, at 10° C. intervals. The viscosity was measured when the temperature values were stable for five minutes. The effective viscosity was calculated at 100 sec$^{-1}$ shear rate based on viscosity measured on a Fann35 rheometer (170 sec$^{-1}$ and 511 sec$^{-1}$) at the various temperatures. The results are set forth in Table II below and are graphically displayed in FIG. 1:

TABLE II

Effective Viscosity at 100 sec$^{-1}$

| FAC-4W/ Temperature | 15 L/m3 | 20 L/m3 | 25 L/m3 | 30 L/m3 | 35 L/m3 | 40 L/m3 |
|---|---|---|---|---|---|---|
| 20° C. | 39 | 59 | 99 | 115 | 155 | 184 |
| 30° C. | 32 | 52 | 85 | 104 | 135 | 172 |
| 40° C. | 21 | 44 | 71 | 89 | 116 | 146 |
| 50° C. | 11 | 35 | 57 | 74 | 97 | 115 |
| 60° C. | — | 26 | 47 | 58 | 77 | 90 |
| 70° C. | — | 17 | 28 | 43 | 58 | 63 |
| 80° C. | — | 8 | 14 | 28 | 38 | 40 |
| 90° C. | — | — | — | 13 | 19 | 25 |
| 95° C. | — | — | — | 5 | 9 | — |

An increase in temperature is seen to affect the gel structure of the system. The system has adequate viscosity at 90° C. Table II illustrates that adjustment of the loading of the gellant controls the gel viscosity. The effect of temperature and loading on gel viscosity is further illustrated.

The viscosity was measured again 18 hours after the gel was prepared. No significant change was observed. It is concluded therefore that short delays in the field will not affect the quality of the gel.

Figure 2:
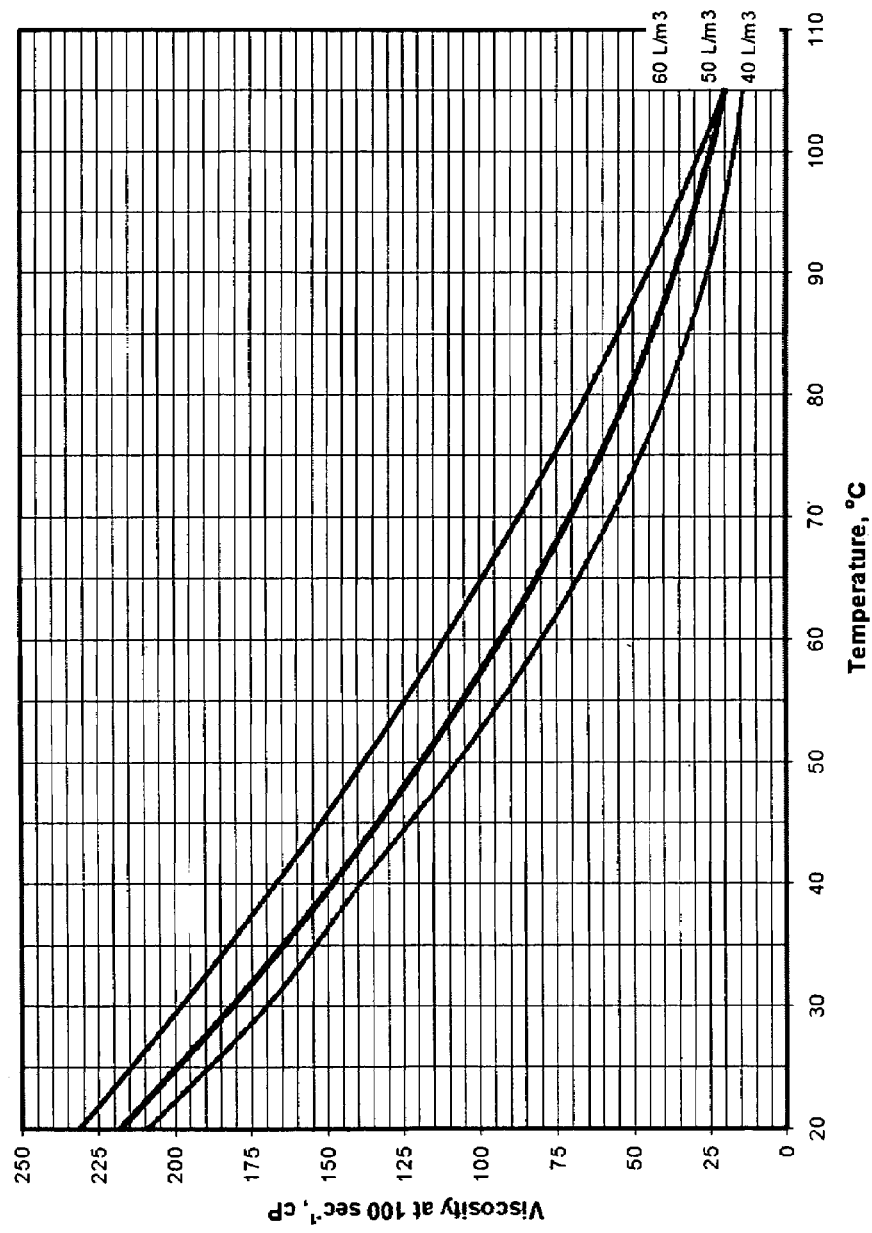
FIG. 2 is a graph of viscosity at various optimized surfactant concentrations against temperature.

The gel with various loadings of FAC-4W was gradually heated to 105° C. in a Brookfield TM high pressure, high temperature rheometer under nitrogen pressure of 150 psi (to prevent the acid from evaporating). The viscosity was measured at a continuous shear of 100 sec$^{-1}$ at various intermediate temperatures at 10° C. intervals. The gel was equilibrated at a given temperature till it reached a stable value and then the viscosity measurement was taken. The results are set forth in Table III below and are graphically displayed in FIG. 2.

TABLE III

Viscosity at 100 sec$^{-1}$

| FAC-4W/ Temperature | 40 L/m³ | 50 L/m³ | 60 L/m³ |
|---|---|---|---|
| 20° C. | 209 | 218 | 231 |
| 30° C. | 170 | 182 | 198 |
| 40° C. | 139 | 149 | 167 |
| 50° C. | 107 | 119 | 138 |
| 60° C. | 80 | 93 | 112 |
| 70° C. | 57 | 71 | 87 |
| 80° C. | 39 | 52 | 65 |
| 90° C. | 26 | 37 | 46 |
| 100° C. | 17 | 25 | 28 |
| 105° C. | 14 | 20 | 21 |

Series B

Admixture with Inorganic Acid/Gel Viscosity in High Strength Acid. The optimized loading of FAC-4W (15 kg of sodium salicylate in 200 L of FAC-1W) was mixed with 15%, 20%, 22% and 25% HCl in a blender for 3 minutes. The viscosity was measured on a Fann35 rheometer. The results are shown in Table IV.

TABLE IV

Viscosity of FAC-4W @ 40 L/m³ in various strength HCl at 25° C.

| % HCl | Viscosity, cP at 100 sec$^{-1}$ |
|---|---|
| 15 | 184 |
| 20 | 67 |
| 22 | 67 |
| 25 | 17 |

Series C

Corrosion Tests of FAC-4W. Into a pressurized container of 3,000 psi, the gel was exposed to N-80 tubular steel at 50° C., 70° C., and 90° C. and allowed to remain for 4 hours. Hydrogen sulfide and carbon dioxide was not present under the exposure conditions. The results are provided in Table V below:

TABLE V

Corrosion rate without iron

| Formulation | Temperature, ° C. | Corrosion rate, lb/ft$^2$ |
|---|---|---|
| FAC-4W @ 40 L/m$^3$ | 50° C. | 0.01 |
| FAC-4W @ 40 L/m$^3$ | 70° C. | 0.02 |
| FAC-4W @ 40 L/m$^3$ | 90° C. | 0.89 |
| FAC-4W @ 40 L/m$^3$ w/ Nowferr 3 @ 20 L/m3 and Nowferr 12 @ 3.5 L/m3 | 90° C. | 0.01 |

At a temperature of 90° C., the gel required a corrosion inhibitor. A suitable corrosion inhibitor was found to be Nowferr 3, a 35 volume percent solution of propargyl alcohol in water, and Nowferr 12, a 45 weight percent solution of potassium iodide in water. When used with FAC-4W, 20 L/m$^3$ of Nowferr 3 and 3.5 L/m$^3$ of Nowferr 12 was mixed with 15% HCl in the blender, the FAC-4W at 40 L/m$^3$ was added and the viscosity was measured on Fann 35 at 170 sec$^{-1}$ and 511 sec$^{-1}$ at 25° C. Nowferr 3 with Nowferr 12 is a suitable corrosion inhibitor package and reduces the corrosion rate to 0.01 lb/ft$^2$.

Series D

Effect of the Presence of Ferric Ion on Gel Viscosity. A solution of ferric ion at 5000 mg/L was mixed with the gel containing no reducing agent as well as the acid blend and the viscosity was measured on Fann35. The results of the corrosion tests, with and without iron, are shown in Tables VI and VII, respectively. Nowferr 1W refers to thioglycolic acid and Nowferr 14P refers to copper sulfate pentahydrate.

TABLE VI

Corrosion rate without iron

| Formulation | Temperature, ° C. | Corrosion rate, lb/ft$^2$ |
|---|---|---|
| FAC-4W @ 40 L/m$^3$ | 50° C. | 0.01 |
| FAC-4W @ 40 L/m$^3$ | 70° C. | 0.02 |
| FAC-4W @ 40 L/m$^3$ Nowferr 3 @ 20 L/m$^3$ Nowferr 12 @ 3.5 L/m$^3$ | 90° C. | 0.01 |
| FAC-4W @ 60 L/m$^3$ Nowferr 3 @ 25 L/m$^3$ Nowferr 12 @ 3.5 L/m$^3$ | 105° C. | 0.049 |

TABLE VII

Corrosion rate with ferric ion at 5000 mg/L

| Formulation | Temperature, ° C. | Corrosion rate, lb/ft$^2$ |
|---|---|---|
| FAC-4W @ 40 L/m$^3$ Nowferr 1W @ 12 L/m$^3$ Nowferr 14P @ 0.75 kg/m$^3$ Nowferr 3 @ 7 L/m$^3$ Nowferr 12 @ 3.5 L/m$^3$ | 70° C. | 0.03 |

TABLE VII-continued

Corrosion rate with ferric ion at 5000 mg/L

| Formulation | Temperature, ° C. | Corrosion rate, lb/ft$^2$ |
|---|---|---|
| FAC-4W @ 40 L/m$^3$ Nowferr 1 @ 34 L/m$^3$ Nowferr 14P @ 1.25 kg/m$^3$ Nowferr 3 @ 25 L/m$^3$ Nowferr 12 @ 3.5 L/m$^3$ | 90° C. | 0.01 |
| FAC-4W @ 60 L/m$^3$ Nowferr 1 @ 34 L/m$^3$ Nowferr 14P @ 1.25 kg/m$^3$ Nowferr 3 @ 25 L/m$^3$ Nowferr 12 @ 3.5 L/m$^3$ | 105° C. | 0.01 |

The presence of iron considerably reduces the gel stability and increases the corrosion rate. The use of Nowferr Acid System with the gel recovers the viscosity of the gel (140 cP at 100 sec-1) and reduces the corrosion rate to acceptable limits (0.05 lb/ft$^2$).

The gel develops viscosities above 20 cP at temperatures up to 90° C. in 15% hydrochloric acid. Without the presence of iron, the gel does not need additional corrosion inhibitor up to 70° C. for corrosion protection. Standard corrosion inhibitors control corrosion at high temperatures and in the presence of iron. With the Nowferr Acid System it is stable up to 5000 mg/L of ferric ion and the corrosion rate is in the industry standards of less than 0.05 lb/ft$^2$ weight loss.

Series E

In this Series, the system was tested for acid compatibility including stability, live and spent acid emulsion test.

Live Acid Compatibility. 50 mL of the acid blend (including an iron solution at 5000 mg/L) was placed in a glass bottle and 50 mL of filtered crude from the Banff formation in Southern Alberta, Canada, aged for two months, was added. The bottle was shaken well for approximately 30 seconds and heated to the desired temperature (BHST) in the water bath and the break time for the acid/oil emulsion was observed. Less than 10 minutes was required for a successful pass. After 30 minutes, the contents were poured through a 100 mesh screen to detect the presence of any sludge.

TABLE VIII

Acid Compatibility Testing (50/50), FAC-4W at 40 L/m$^3$ and 15% HCl

| Temperature | Concentration of Ferric Ion | Loading of Nowferr Acid System | Sludge Test | Emulsion Break Time |
|---|---|---|---|---|
| 70° | 5000 mg/L | Nowferr1W at 12 L/m$^3$ Nowferr14P at 0.75 kg/m$^3$ Nowferr3 at 7.0 L/m$^3$ Nowferr12 at 3.5 L/m$^3$ | No sludge formed | Less than 10 min |
| 90° | 5000 mg/L | Nowferr1 at 34 kg/m$^3$ Nowferr14P at 1.25 kg/m$^3$ Nowferr3 at 25 L/m$^3$ Nowferr12 at 3.5 L/m$^3$ | No sludge formed | Less than 10 min |

Spent Acid Compatibility. 50 mL of the acid blend (with and without iron solution at 5000 mg/L) and 50 mL of filtered crude from the Banff formation in Southern Alberta, Canada, aged for two months, was placed in a 1 L disposable beaker containing marble chips and the acid was allowed to completely react with the marble chips. When the acid was completely spent, the mixture was poured into a glass bottle and checked for emulsion break and sludge similar to the live acid test. The results are illustrated in Table IX.

TABLE IX

Acid Compatibility Testing (50/50), FAC-4W at 40 L/m$^3$ and 15% HCl

| Temperature | Concentration of Ferric Ion | Loading of Nowferr Acid System | Sludge Test | Emulsion Break Time |
|---|---|---|---|---|
| 70° C. | — | — | No sludge formed | Less than 10 min |
| 90° C. | — | Nowferr3 at 20 L/m$^3$ Nowferr12 at 3.5 L/m$^3$ | No sludge formed | Less than 10 min |
| 70° C. | 5000 mg/L | Nowferr1W at 12 L/m$^3$ Nowferr14P at 0.75 kg/m$^3$ Nowferr3 at 7.0 L/m$^3$ Nowferr12 at 3.5 L/m$^3$ | No sludge formed | Less than 10 min |
| 90° C. | 5000 mg/L | Nowferr3 at 25 L/m$^3$ Nowferr12 at 3.5 L/m$^3$ Nowferr1 at 34 L/m$^3$ Nowferr14P at 1.25 kg/m$^3$ | No sludge formed | Less than 10 min |

Series F

Foam Test. The gelled acid blend including ferric ion at 5000 mg/L and FAC-4W at 40 L/m$^3$ was mixed on high speed in the blender for 30 seconds. (To test at high temperatures the acid blend was preheated and the grad cylinder was preheated in water bath adjusted to the required temperature). The foam was poured into graduated cylinder and the total volume of the foam was noted. The half-life (the time taken for the volume to comedown to half the initial volume of the foam) of the foam was recorded. The gel system breaks on contact with the crude oil and by the addition of Breaker AC-30. Breaker AC-30 reduces viscosity with time. Breaker AC-30 is a mixture of paraffin oil and mineral oil and has controlled solubility in the gel and thus is a means of slowly introducing hydrocarbon into the gel.

The half-life of the foam is greater than 20 minutes for all gel formulations, the results are shown in Table X.

TABLE X

Foam Testing, FAC-4W at 40 L/m$^3$ and 15% hydrochloric acid

| Temperature | Concentration of Ferric Ion | Loading of Nowferr Acid System | Foam half-live |
|---|---|---|---|
| 25° C. | — | — | >20 min |
| 80° C. | — | Nowferr3 at 20 L/m$^3$ Nowferr12 at 3.5 L/m$^3$ | >20 min |
| 60° C. | 5000 mg/L | Nowferr1W at 12 L/m$^3$ Nowferr14P at 0.75 kg/m$^3$ | >20 min |
| 80° C. | 5000 mg/L | Nowferr3 at 7.0 L/m$^3$ Nowferr12 at 3.5 L/m$^3$ Nowferr3 at 25 L/m$^3$ Nowferr12 at 3.5 L/m$^3$ Nowferr1 at 34 L/m$^3$ Nowferr14P at 1.25 kg/m$^3$ | >20 min |

The gelled acid also shows foam stability and so can be used as a medium for foamed acid with nitrogen or carbon dioxide. The gel viscosity breaks when one of the following happen: (i) the acid spends: (ii) when the gel comes in contact with formation oil; (iii) with addition of an external breaker, Breaker AC 30.

Series G

Viscosity of selected gelled surfactant based acids with 28% HCl were measured. The results are tabulated in Table XI below:

TABLE XI

Viscosity of 28% HCl at 100 sec–1 at 25° C.

| Loading of FAC-4W, L/m3 | Viscosity, cP at 100 sec$^{-1}$ |
|---|---|
| 40 | 10 |
| 50 | 17 |
| 60 | 28 |

These tests demonstrate that even with 28% HCl, at higher loading of FAC-4W, viscosity increase can be achieved. The viscosity of this system further increases as the acid is spent and the strength of the acid is reduced as shown in the tests of Series B above.

What is claimed is:

1. A viscoelastic fluid for enhancing the productivity of a hydrocarbon-bearing formation comprising water, an inorganic acid, a $C_{10}$ to $C_{24}$ alkyl trialkyl quaternary ammonium aromatic salt and an iron control agent, wherein the weight percent of inorganic acid in the viscoelastic fluid is between from about 10 to about 35 weight percent and further wherein the viscoelastic fluid does not contain a foaming agent and is stable in the presence of dissolved ferric iron.

2. The viscoelastic fluid of claim 1, wherein the fluid contains an anionic surfactant.

3. The viscoelastic fluid of claim 2, wherein the anionic surfactant is sodium xylene sulfonate.

4. The viscoelastic fluid of claim 1, wherein the viscoelastic fluid exhibits at 20° C. a viscosity of from about 40 to about 230 cP @ 100 sec$^{-1}$.

5. The viscoelastic fluid of claim 1, wherein the corrosion rate up to about 70° C. is no greater than 0.05 lb/ft$^2$ in the absence of a corrosion inhibitor.

6. The viscoelastic fluid of claim 1, wherein the viscoelastic fluid contains a corrosion inhibitor.

7. The viscoelastic fluid of claim 6, wherein the corrosion rate at a temperature of about 105° C. is no greater than 0.05 lb/ft$^2$.

8. The viscoelastic fluid of claim 6, wherein the corrosion inhibitor contains propargyl alcohol and potassium iodide.

9. The viscoelastic fluid of claim 1, wherein the inorganic acid is selected from the group consisting of hydrochloric acid, hydrofluoric acid and phosphoric acid.

10. A method for enhancing the productivity of a hydrocarbon-bearing formation comprising pumping into the formation the fluid of claim 1.

11. The method of claim 10, wherein the fluid is used in matrix acidizing.

12. The method of claim 10, wherein the fluid is used in acid fracturing.

13. The method of claim 10, wherein the viscosity of the fluid is reduced after being pumped into the formation by reaction of the inorganic acid with the formation.

14. The method of claim 10, wherein the inorganic acid is selected from the group consisting of hydrochloric acid, hydrofluoric acid and phosphoric acid.

15. The method of claim 10, wherein the fluid contains an anionic surfactant.

16. The method of claim 15, wherein the anionic surfactant is sodium xylene sulfonate.

17. The method of claim 10, wherein the viscoelastic fluid contains a corrosion inhibitor.

18. The method of claim 17, wherein the corrosion inhibitor contains propargyl alcohol and potassium iodide.

19. The viscoelastic fluid of claim 1, wherein the $C_{10}$ to $C_{24}$ alkyl trialkyl quaternary ammonium aromatic salt is a $C_{10}$ to $C_{24}$ alkyl trialkyl quaternary ammonium salicylate.

20. The viscoelastic fluid of claim 19, wherein the surfactant is a $C_{18}$ alkyl trimethyl quaternary ammonium salicylate.

21. The method of claim 10, wherein the $C_{10}$ to $C_{24}$ alkyl trialkyl quaternary ammonium aromatic salt is a $C_{10}$ to $C_{24}$ alkyl trialkyl quaternary ammonium salicylate.

22. The method of claim 21, wherein the surfactant is a $C_{18}$ alkyl trialkyl quaternary ammonium salicylate.

* * * * *